(12) United States Patent
Chen et al.

(10) Patent No.: US 11,790,811 B2
(45) Date of Patent: Oct. 17, 2023

(54) FLEXIBLE DISPLAY PANEL AND ELECTRONIC DEVICE

(71) Applicant: BEIJING XIAOMI MOBILE SOFTWARE CO., LTD., Beijing (CN)

(72) Inventors: Jing Chen, Beijing (CN); Chiafu Yen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 33 days.

(21) Appl. No.: 17/244,887

(22) Filed: Apr. 29, 2021

(65) Prior Publication Data

US 2022/0058989 A1 Feb. 24, 2022

(30) Foreign Application Priority Data

Aug. 21, 2020 (CN) .......................... 202010851847.6

(51) Int. Cl.
*G09F 9/30* (2006.01)
*G02F 1/1333* (2006.01)

(52) U.S. Cl.
CPC ........ *G09F 9/301* (2013.01); *G02F 1/133305* (2013.01); *G02F 1/133394* (2021.01); *G02F 2201/503* (2013.01); *G02F 2202/22* (2013.01)

(58) Field of Classification Search
CPC ............... G09F 9/301; G02F 1/133305; G02F 1/133394; G02F 2202/22; G06F 1/1641; G06F 1/1652; G06F 3/016
See application file for complete search history.

(56) References Cited

U.S. PATENT DOCUMENTS

| | | | |
|---|---|---|---|
| 2020/0059733 A1 | 2/2020 | Shin et al. | |
| 2020/0374634 A1* | 11/2020 | Ohashi | .............. G09F 27/00 |
| 2020/0404427 A1 | 12/2020 | Shin et al. | |

FOREIGN PATENT DOCUMENTS

| | | |
|---|---|---|
| EP | 3613514 A1 | 2/2020 |
| EP | 3723389 A1 | 10/2020 |
| WO | 2019111775 A1 | 6/2019 |

OTHER PUBLICATIONS

European Search Report in European Application No. 21170732.8, dated Oct. 21, 2021, (7p).

* cited by examiner

*Primary Examiner* — Jessica M Merlin
(74) *Attorney, Agent, or Firm* — Arch & Lake LLP

(57) ABSTRACT

A flexible display panel and an electronic device are provided. The flexible display panel may include an unbent state and a bent state. A bending part of the flexible display panel may be bent when the flexible display panel is in the bent state. The flexible display panel may include a display layer, a bonding layer, and a support layer. The bonding layer may be bonded between the display layer and the support layer. The support layer and the bonding layer may include buffer openings. The buffer openings may be positioned to at least correspond to the bending part.

14 Claims, 7 Drawing Sheets

FLEXIBLE DISPLAY PANEL AND ELECTRONIC DEVICE

CROSS-REFERENCE TO RELATED APPLICATION

This application is based upon and claims priority to Chinese Patent Application No. 202010851847.6, filed on Aug. 21, 2020, the entire contents of which are incorporated herein by reference for all purposes.

TECHNICAL FIELD

The present disclosure relates to the technical field of terminals, and more particularly, to a flexible display panel and an electronic device.

BACKGROUND

With the development of flexible Organic Light-Emitting Diode (OLED) display screen technology, foldable electronic devices have both the portability of common electronic devices and the ultimate experience of large screen displays after being unfolded, which makes the foldable electronic devices have become an important development trend of mobile terminals and become an important field of competition for various terminal manufacturers.

SUMMARY

The present disclosure provides a flexible display panel and an electronic device, to solve the shortages in the prior art.

According to a first aspect of the present disclosure, there is provided a flexible display panel having an unbent state and a bent state. A bending part of the flexible display panel is bent when the flexible display panel is in the bent state. The flexible display panel may include a display layer, a bonding layer and a support layer. The bonding layer may be bonded between the display layer and the support layer. The support layer and the bonding layer may include buffer openings. The buffer openings may be positioned to at least correspond to the bending part.

According to a second aspect of the present disclosure, there is provided an electronic device. The electronic device may include a flexible display panel. The flexible display panel may include an unbent state and a bent state. A bending part of the flexible display panel may be bent when the flexible display panel is in the bent state. The flexible display panel may include a display layer, a bonding layer and a support layer. The bonding layer may be bonded between the display layer and the support layer. The support layer and the bonding layer may include buffer openings. The buffer openings may be positioned to at least correspond to the bending part.

It is to be understood that the above general descriptions and detailed descriptions below are only examples and explanatory and not intended to limit the present disclosure.

BRIEF DESCRIPTION OF THE DRAWINGS

The accompanying drawings, which are incorporated in and constitute a part of the description, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A/an", "said" and "the" in a singular form in the present disclosure and the appended claims are also intended to include a plural form, unless other meanings are clearly denoted throughout the present disclosure. It is also to be understood that expression "and/or" used in the present disclosure refers to and includes any or all possible combinations of one or more associated items that are listed.

It is to be understood that, although terms "first", "second", "third" and the like may be adopted to describe various information in the present disclosure, the information should not be limited to these terms. These terms are only adopted to distinguish the information of the same type. For example, without departing from the scope of the present disclosure, first information may also be called second information and, similarly, second information may also be called first information. For example, the wording "if" used here may be explained as "while" or "when" or "in response to a determination", depending on the context.

Figure 1:
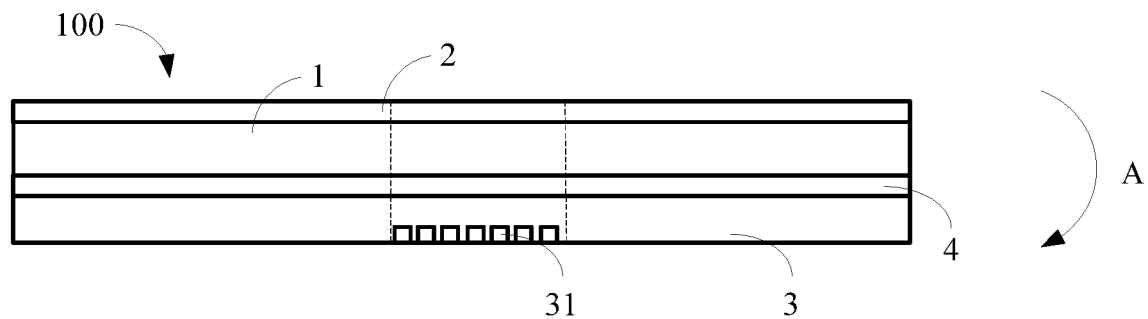
FIG. 1 is a schematic diagram illustrating a flexible display panel in an unbent state, according to an example of the present disclosure.
Figure 2:
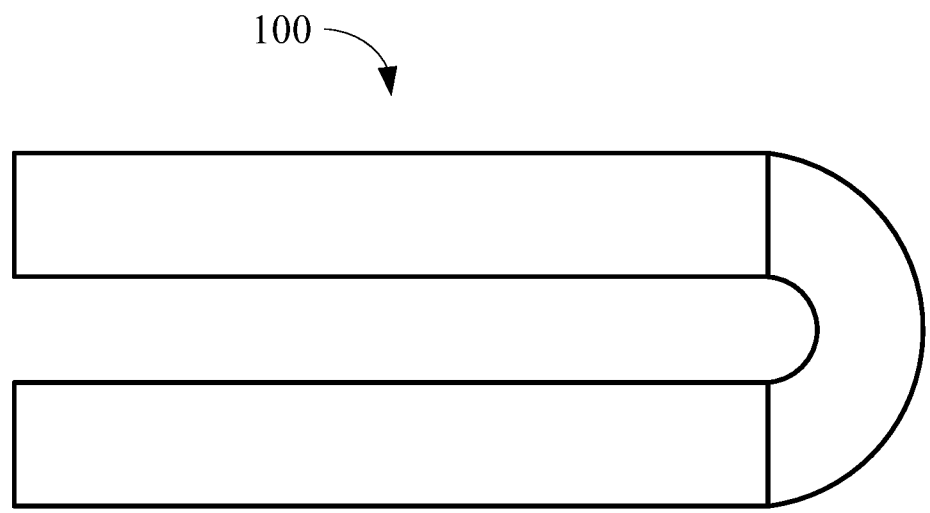
FIG. 2 is a schematic diagram illustrating the flexible display panel in FIG. 1 in a bent state.

FIG. 1 is a schematic diagram illustrating a flexible display panel 100 in an unbent state, according to an example. FIG. 2 is a schematic diagram illustrating a flexible display panel 100 in FIG. 1 in a bent state. As shown in FIG. 1 and FIG. 2, the flexible display panel 100 may be switched between the unbent state shown in FIG. 1 and the bent state shown in FIG. 2. Specifically, as shown in FIG. 1 and FIG. 2, a bending part of the flexible display panel 100 may be bent, such that an included angle between planar parts at two sides of the bending part can be changed. Certainly, after the flexible display panel 100 shown in FIG. 1 is bent for 180° along the clockwise direction shown by an arrow A in FIG. 1, display sides of the flexible display panel 100 may be located in up and down directions in FIG. 2, and the flexible display panel may also rotate for other angles in other embodiments, which is not limited in the present disclosure. Alternatively, in some embodiments, the flexible display panel 100 in FIG. 1 may also be rotated by 180° in the counterclockwise direction as shown by an arrow B in FIG. 3 so that display regions are arranged opposite to each other.

The flexible display panel 100 may include a display layer 1, a protective layer 2, a support layer 3 and a bonding layer 4. The protective layer 2 may include a flexible film protective layer. The flexible film protective layer can resist an impact force from the front surface of the display panel 100 and perform dustproof protection on the display panel 100. The bonding layer 4 may be connected to a side, away from the protective layer 2, of the display layer 1. The bonding layer 4 may further be connected to the support layer 3. The bonding layer 4 is located between the support layer 3 and the display layer 1. As shown in FIG. 1, the support layer 3 may include buffer openings 31, and the buffer openings 31 are positioned to correspond to the bending part, such that when the bending part of the flexible display panel 100 is bent, an internal stress of the flexible display panel 100 may be buffered through the buffer openings 31, and thus the probability of warping or cracking or deformation of the flexible display panel 100 is reduced. The bonding layer 4 may include a photoresist layer or other glue layers, but is not limited thereto in the present disclosure.

Figure 3:
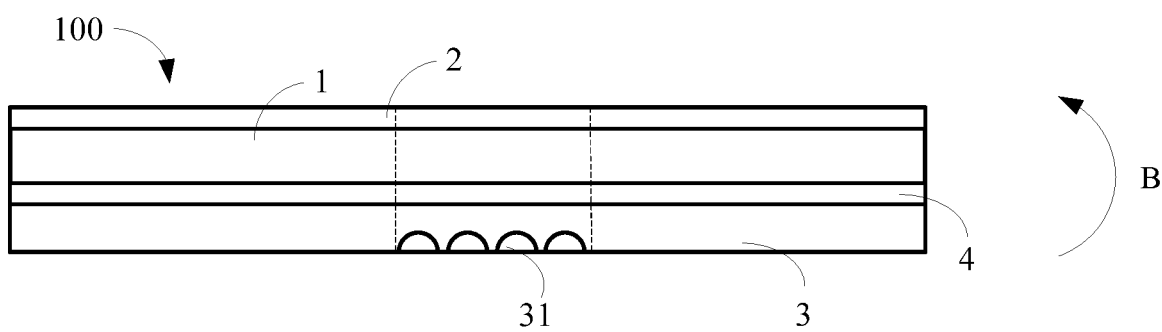
FIG. 3 is a schematic diagram illustrating another flexible display panel in an unbent state, according to an example of the present disclosure.

The cross section of the buffer opening 31 may be in a shape of a square as shown in FIG. 1. Alternatively, in some embodiments, as shown in FIG. 3, the cross section of the buffer opening 31 may also be in a shape of an arc. In other some embodiments, the buffer opening 31 may also be in a shape of a trapezoid or a triangle or have other regular shapes. Certainly, the buffer opening 31 may also have other irregular shapes. Multiple buffer openings 31 may be the same and may also be different in shape, which is not limited in the present disclosure. In addition, in other some embodiments, the buffer openings 31 may further be provided at another position of the support layer 3. For example, the buffer openings 31 may also be provided at another position not corresponding to the bending part of the support layer 3. In other some embodiments, the buffer openings 31 may also be provided on the bonding layer 4. Alternatively, in yet some embodiments, the buffer openings may be simultaneously provided on the bonding layer 4 and the support layer 3, so as to further enhance the capacity of the flexible display panel 100 to buffer the stress.

Figure 4:
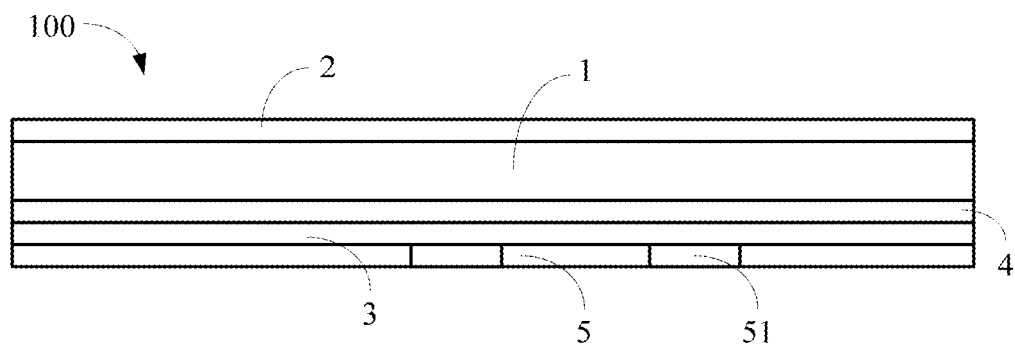
FIG. 4 is a cross-sectional schematic diagram illustrating a display panel, according to an example of the present disclosure.

As shown in FIG. 4, the support layer 3 may be a piezoelectric film layer, and the buffer openings 31 may be at least provided in a region, corresponding to the bending part, on the piezoelectric film layer. The piezoelectric film layer may be bonded to the display layer 1 through the bonding layer 4, such that when the piezoelectric film layer is powered on, the piezoelectric film layer may be deformed, thereby driving the display layer, the protective layer 2 and the bonding layer 4 to vibrate, to achieve a sound production of the flexible display panel 100. Meanwhile, when the user touches or presses the flexible display panel 100, the piezoelectric film layer may be powered on, to drive the display layer 1 and the protective layer 2 to vibrate, thereby providing tactile feedback on the touch or press operation performed by the user. The flexible display panel 100 may include an organic light-emitting display panel.

Further, still as shown in FIG. 4, the flexible display panel 100 may further include an electrostatic protective layer 5. The electrostatic protective layer 5 may be connected to the support layer 3, and the support layer 3 is disposed between the display layer 1 and the electrostatic protective layer 5. In this way, the electrostatic protective purpose may be achieved through the electrostatic protective layer 5 during power supply of the piezoelectric film layer. The electrostatic protective layer 5 may include a copper foil layer. Furthermore, still as shown in FIG. 4, the electrostatic protective layer 5 may include an air vent 51. The heat dissipation of the piezoelectric film layer, the display layer and the like may be performed through the electrostatic protective layer 5.

As can be seen from the above embodiment, in the flexible display panel 100 of the present disclosure, the display layer 1 may be supported through connection between the support layer 3 and the display layer 1, which is beneficial to improving the overall impact resistance of the flexible display panel 100. Since the support layer 3 may include the piezoelectric film layer, the flexible display panel 100 may be vibrated through the piezoelectric film layer to achieve the purposes of sound production by vibration and tactile feedback.

Figure 5:
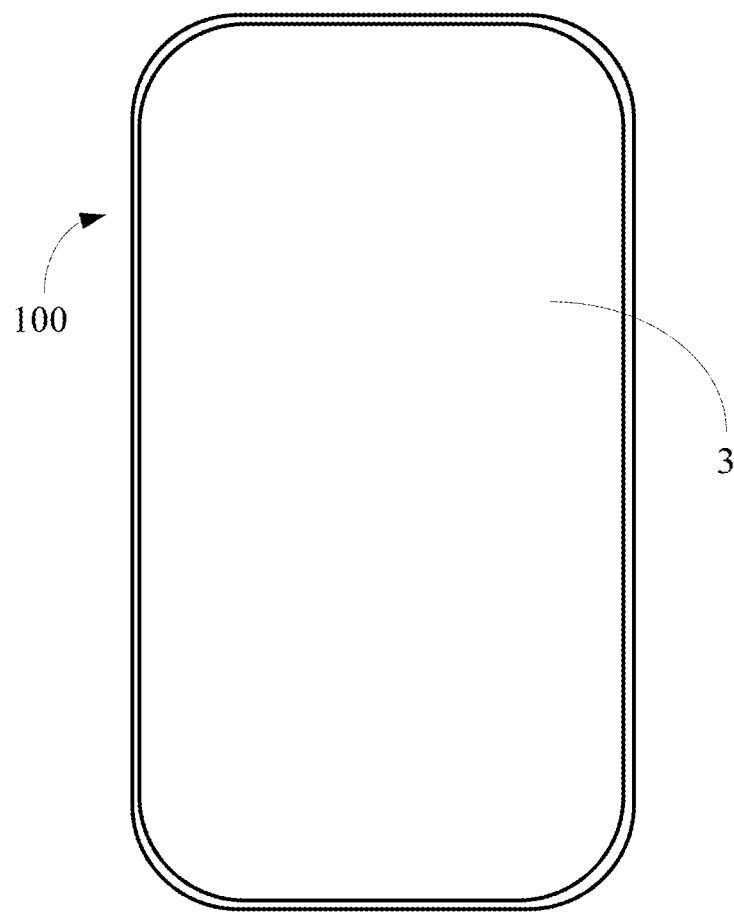
FIG. 5 is a top view illustrating a display panel, according to an example of the present disclosure.
Figure 6:
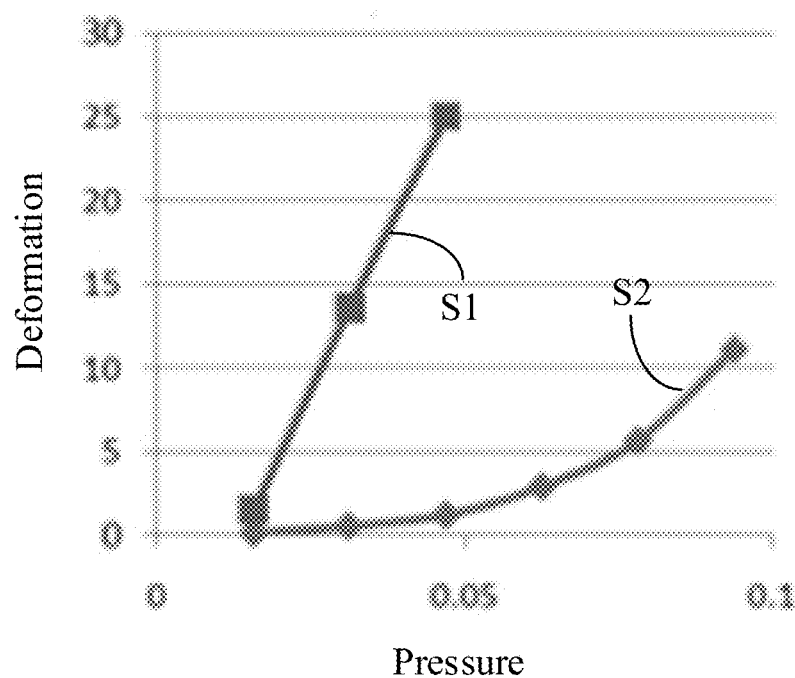
FIG. 6 is a diagram illustrating a relationship between a pressure-deformation curve of buffer foam and a pressure-deformation curve of a piezoelectric film layer, according to an example of the present disclosure.

Presently, in order to buffer an impact force from a back side, the display panel configured for the electronic device is usually provided with buffer foam at a back side of the display panel, away from the display side. The buffer foam, however, has relatively weak impact resistance and can be deformed easily when subjected to external impacts, which results in that the display panel deforms therewith. Generally, in a case where the back impact force is more than 10 N, the impact force is acted on the display layer of the display panel through the buffer foam, which easily causes pits on the front surface of the display panel. In a case where the back impact force is more than 300 N, the impact force is acted on the display layer of the display panel through the buffer foam, which easily causes defective pixels to appear on the display panel and poor display effect. Hence, in an embodiment, as shown in FIG. 4 and FIG. 5, the support layer 3 may be the piezoelectric film layer. That is, the piezoelectric film layer may be connected to the display layer 1 through the bonding layer 4. According to the pressure-deformation curve of each of the buffer foam and the piezoelectric film layer in FIG. 6, the piezoelectric film layer has a higher hardness; and under the same pressure, the deformation of the piezoelectric film layer is less than that of the buffer foam. Therefore, compared with the technical examples in which the buffer foam is used for supporting in the related art, the display layer 1 is supported by the piezoelectric film layer in the present disclosure, which can realize the functions of the sound production by vibration and tactile feedback of the flexible display panel 100, while improving the impact resistance of the flexible display panel 100, and reducing the damage risk of the flexible display panel 100 under the action of the external impact force; and which can also facilitate increasing the area of the flexible display panel, thereby increasing the area of a region of the flexible display panel 100 in which the tactile feedback can be performed.

Figure 7:
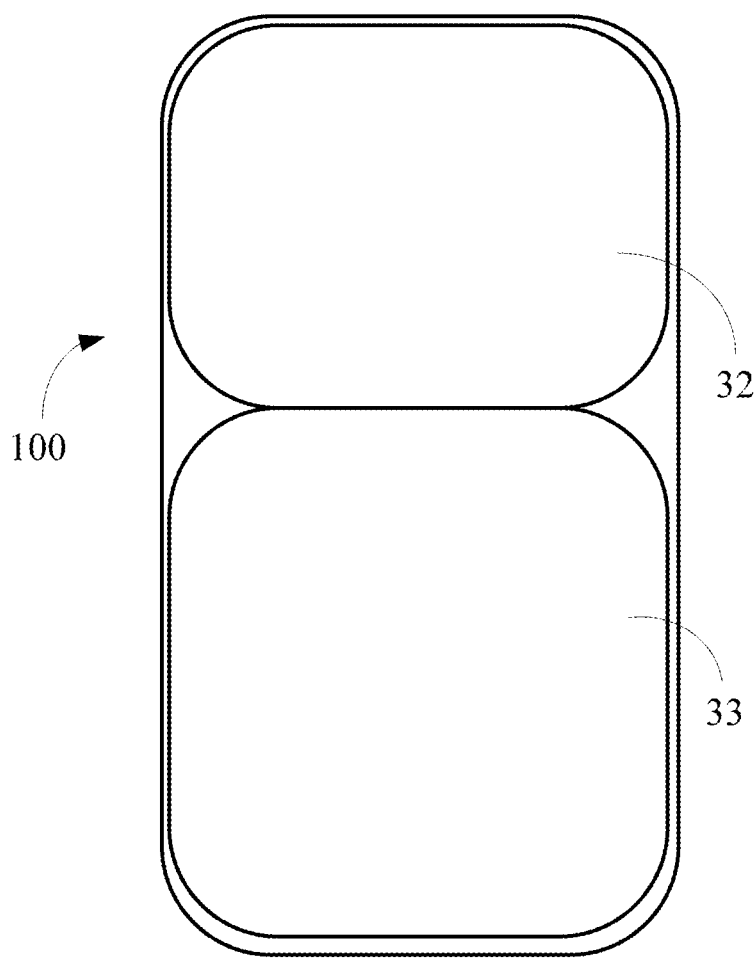
FIG. 7 is a top view illustrating another display panel, according to an example of the present disclosure.
Figure 8:
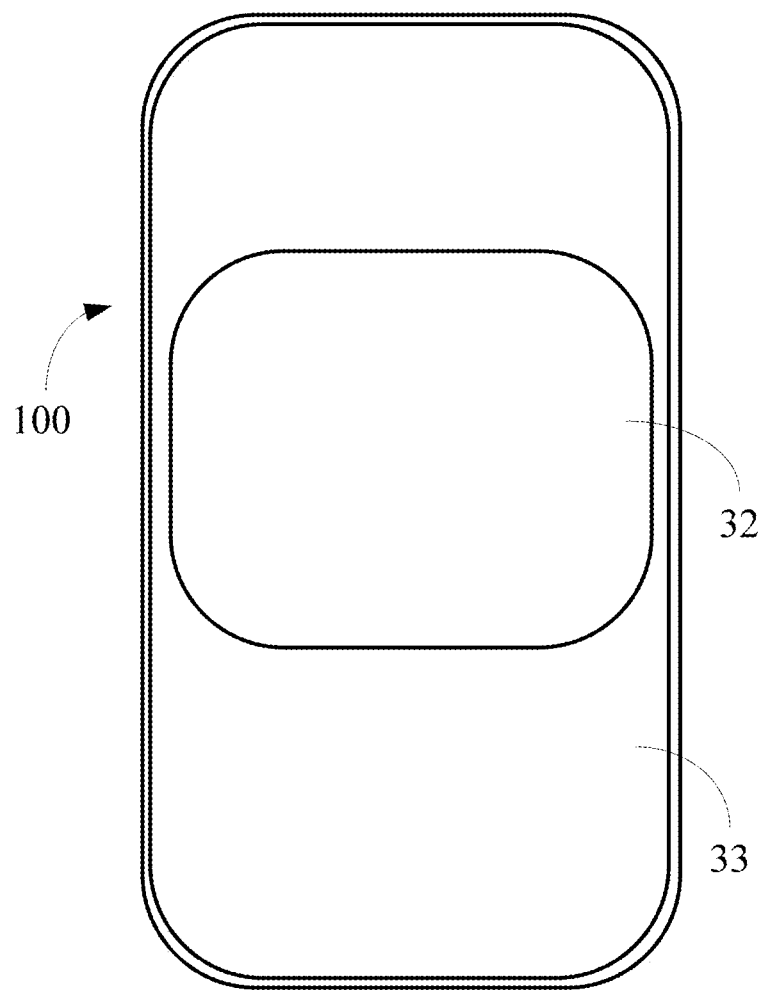
FIG. 8 is a top view illustrating a yet another display panel, according to an example of the present disclosure.

In another embodiment, as shown in FIG. 7 and FIG. 8, the support layer 3 may include a piezoelectric film layer 32 and a buffer layer 33, and at least one of the buffer layer 33 or the piezoelectric film layer 32 may be connected to the display layer 1 through the bonding layer 4. The buffer layer 33 may include foam. The buffer layer 33 and the piezoelectric film layer 32 may jointly implement the support action, which can realize the sound production by vibration and tactile feedback of the flexible display panel 100, while reducing the material usage of the piezoelectric film layer 32, thereby reducing the cost. The buffer layer 33 and the piezoelectric film layer 32 may be arranged adjacent to each other as shown in FIG. 7, or the buffer layer 33 may be arranged around the piezoelectric film layer 32 as shown in FIG. 8. Alternatively, in other embodiments, the piezoelectric film layer 32 may be arranged around the buffer layer 33, or the buffer layer 33 may be arranged around a part of the piezoelectric film layer 32, or the piezoelectric film layer 32 may be arranged around a part of the buffer layer 33, which is not limited in the present disclosure.

Figure 9:
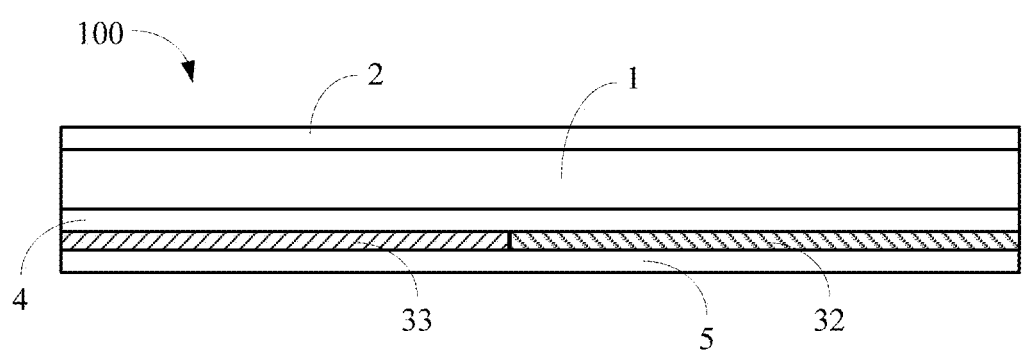
FIG. 9 is a first cross-sectional schematic diagram of a display panel, according to an example of the present disclosure.
Figure 10:
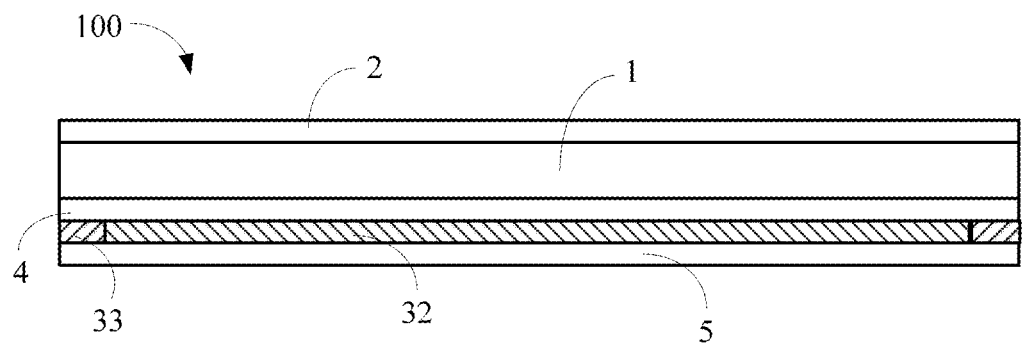
FIG. 10 is a second cross-sectional schematic diagram of a display panel, according to an example of the present disclosure.

In an embodiment, as shown in FIG. 9 and FIG. 10, the piezoelectric film layer 32 and the buffer layer 33 of the support layer 3 may be connected to the display layer 1 through the bonding layer 4. That is, the buffer layer 33 and the piezoelectric film layer 32 may be arranged side by side, and both the piezoelectric film layer 32 and the buffer layer 33 may be substantially the same in thickness, and thus each may be connected to the display layer 1 and the electrostatic protective layer 5. Comparing the embodiment in FIG. 10 with the embodiment in FIG. 9, the piezoelectric film layer 32 in FIG. 10 has a larger area, such that the area of the region for the tactile feedback on the flexible display panel 100 is larger and the sound pressure level when the flexible display panel 100 produces the sound is higher.

Figure 11:
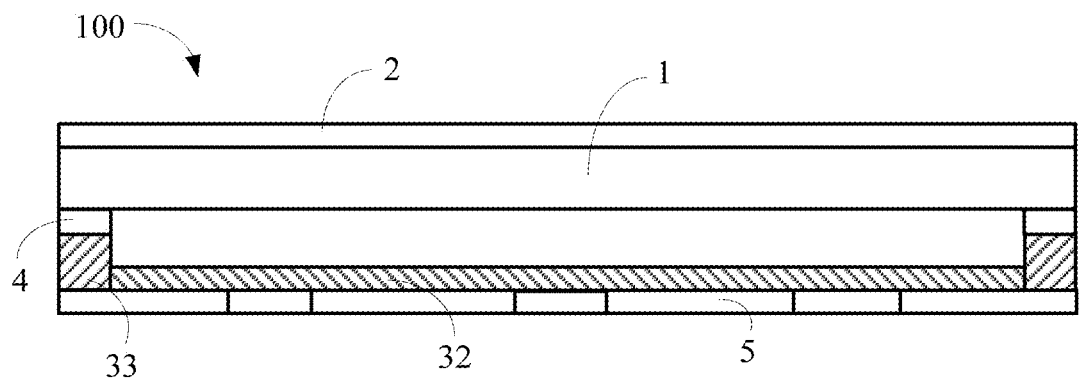
FIG. 11 is a third cross-sectional schematic diagram of a display panel, according to an example of the present disclosure.

In another embodiment, as shown in FIG. 11, the buffer layer 33 may be arranged around the piezoelectric film layer 32, and the buffer layer 33 may be connected to the display layer 1 through the bonding layer 4. The buffer layer 33 may further be connected to the electrostatic protective layer 5, while the piezoelectric film layer 32 is connected to the electrostatic protective layer 5, and the piezoelectric film layer 32 and the display layer 1 may be spaced from each other by a predetermined distance. When the piezoelectric film layer 32 vibrates, the vibration may be transmitted to the electrostatic protective layer 5 and the buffer layer 33, and then to the display layer 1 and the protective layer 2 through the buffer layer 33. As the composite structure of the electrostatic protective layer 5 for driving the display layer 1 and the protective layer 2 is relatively light, the pushing force for pushing the electrostatic protective layer 5 to vibrate is less than that for pushing the display layer 1 and the protective layer 2. Further, when the piezoelectric film layer 32 is connected to each of positions in a region, which is surrounded by the buffer layer 33, of the electrostatic protective layer 5, a sound chamber may be formed by the piezoelectric film layer 32, the buffer layer 33 and the display layer 1 surrounding the sound chamber, to improve the sound production effect of the flexible display panel 100. Alternatively, in other embodiments, if a part of positions in the region, surrounded by the buffer layer 33, of the electrostatic protective layer 5 is not attached with the piezoelectric film layer 32, the sound chamber may be formed by the piezoelectric film layer 32, the buffer layer 33, the display layer 1 and the electrostatic protective layer 5 surrounding the sound chamber.

Figure 12:
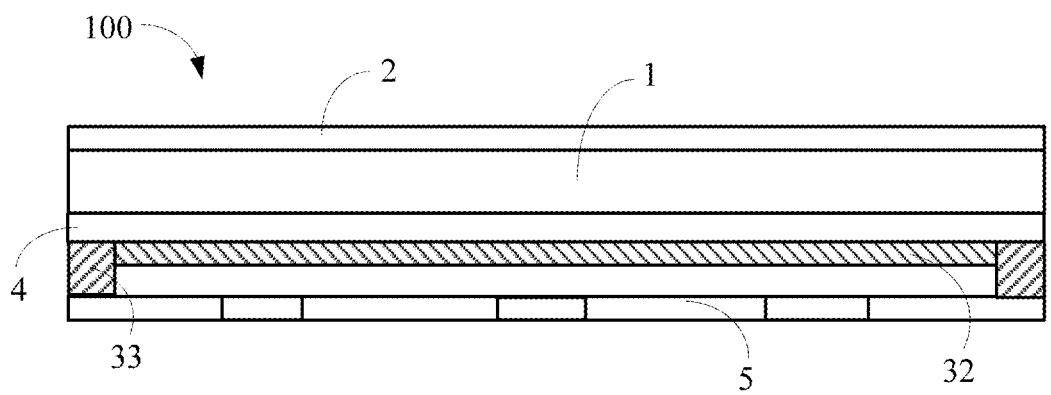
FIG. 12 is a fourth cross-sectional schematic diagram of a display panel, according to an example of the present disclosure.

In yet another embodiment, as shown in FIG. 12, the buffer layer 33 may be arranged around the piezoelectric film layer 32. The buffer layer 33 may be connected to the display layer 1 through the bonding layer 4, and the other side of the buffer layer 33 may be connected to the electrostatic protective layer 5. The piezoelectric film layer 32 may be connected to the display layer 1 through the bonding layer 4, and the piezoelectric film layer 32 and the electrostatic protective layer 5 may be spaced from each other by a predetermined distance. Hence, when the piezoelectric film layer 32 vibrates, since the piezoelectric film layer 32 is directly connected to the display layer 1, the vibration may be directly transmitted to the display layer 1. Compared with the embodiment in FIG. 11, the transfer process of the vibration can be shortened, and thus the loss is reduced. Moreover, when the piezoelectric film layer 32 is connected to each of positions in a region, which is surrounded by the buffer layer 33, of the display layer 1, a sound chamber may be formed by the piezoelectric film layer 32, the buffer layer 33 and the electrostatic protective layer 5 surrounding the sound chamber, to improve the sound production effect of the flexible display panel 100. Alternatively, in other embodiments, if a part of positions in the region, surrounded by the buffer layer 33, of the display layer 1 is not attached with the piezoelectric film layer 32, the sound chamber may also be formed by the piezoelectric film layer 32, the buffer layer 33, the display layer 1 and the electrostatic protective layer 5 surrounding the sound chamber.

In the above embodiments, a first heat dissipation layer (not shown) may further be disposed in the flexible display panel 100. The first heat dissipation layer may be disposed between the support layer 3 and the electrostatic protective layer 5, and may specifically be disposed between the buffer layer 33 and the electrostatic protective layer 5, or disposed between the piezoelectric film layer 32 and the electrostatic protective layer 5, or the first heat dissipation layer is disposed between the buffer layer 33 and the electrostatic protective layer 5 as well as between the piezoelectric film layer 32 and the electrostatic protective layer 5, which is not limited in the present disclosure.

Similarly, a second heat dissipation layer (not shown) may be disposed between the support layer 3 and the display layer 1. The second heat dissipation layer may be disposed between the buffer layer 33 and the display layer 1, or may also be disposed between the piezoelectric film layer 32 and the display layer 1, or the second heat dissipation layer is disposed between the buffer layer 33 and the display layer 1 as well as between the piezoelectric film layer 32 and the display layer 1. The heat dissipation layer may be designed specifically as required, which is not limited in the present disclosure. Each of the first heat dissipation layer and the second heat dissipation layer may include a graphite layer.

Figure 13:
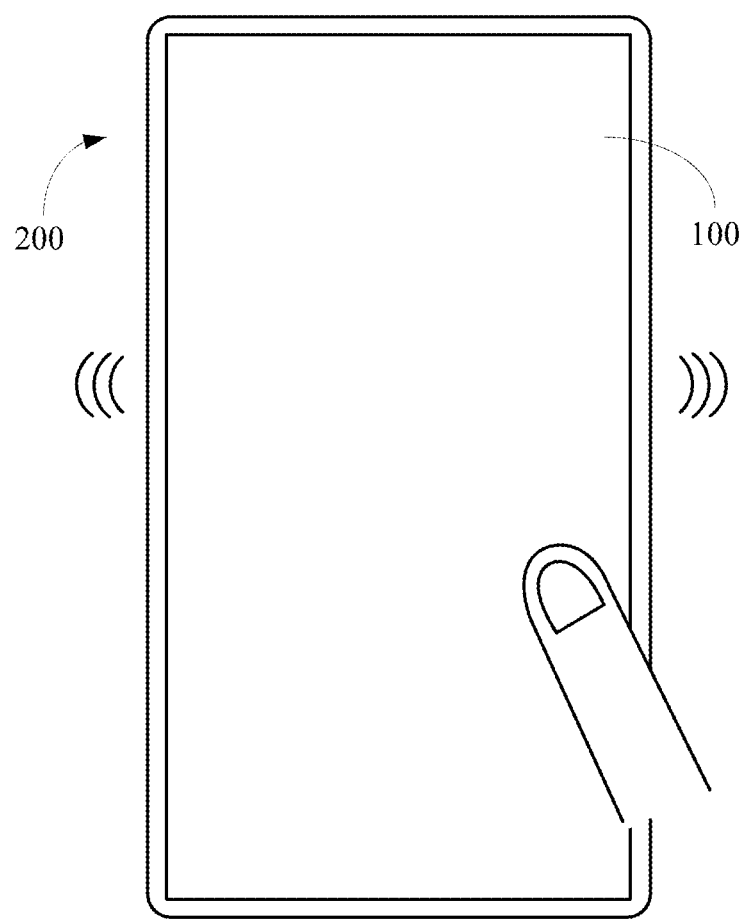
FIG. 13 is a structural schematic diagram illustrating an electronic device, according to an example of the present disclosure.

Based on the flexible display panel 100 in the above embodiments, the present disclosure further provides an electronic device 200 shown in FIG. 13. The electronic device 200 may be configured with the flexible display panel 100 in the above any embodiment. The electronic device 200 may have a bent state and an unbent state, so as to have the visual effect of large-screen display and portability at the same time. Moreover, through the flexible display panel 100, the sound production and tactile feedback functions of the electronic device 200 may be implemented. The electronic device 200 may include devices such as a mobile phone terminal, a tablet device terminal and a smart home device.

Other implementations of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary technical means in the art. It is intended that the specification and examples be considered as examples only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A flexible display panel comprising:
    an unbent state, and
    a bent state, wherein a bending part of the flexible display panel is bent when the flexible display panel is in the bent state; and
    wherein the flexible display panel comprises a display layer, a bonding layer, and a support layer, wherein the bonding layer is bonded between the display layer and the support layer, wherein at least one of the support layer and the bonding layer comprises buffer openings, wherein the buffer openings is positioned to at least correspond to the bending part,
    wherein the support layer comprises a piezoelectric film layer, wherein the piezoelectric film layer drives the display layer to vibrate in response to being deformed, and
    wherein the flexible display panel further comprises an electrostatic protective layer, coupled to a side of the support layer and away from the display layer.

2. The flexible display panel of claim 1, wherein the support layer comprises a buffer layer, wherein at least one of the buffer layer or the piezoelectric film layer are coupled to the display layer through the bonding layer; and
    wherein when the support layer comprises the buffer openings, the buffer openings are provided on at least one of the piezoelectric film layer and the buffer layer.

3. The flexible display panel of claim 2, wherein
    the buffer layer is arranged around at least a part of the piezoelectric film layer.

4. The flexible display panel of claim 1, wherein the support layer comprises a buffer layer, wherein the buffer layer and the piezoelectric film layer are coupled to the electrostatic protective layer and the display layer.

5. The flexible display panel of claim 1, wherein the support layer comprises a buffer layer arranged around the piezoelectric film layer, wherein the buffer layer is coupled to the display layer and the electrostatic protective layer, and wherein the piezoelectric film layer is coupled to the display layer and is spaced from the electrostatic protective layer by a predetermined distance; and
    wherein a sound chamber is formed by the piezoelectric film layer, the electrostatic protective layer, and the buffer layer surrounding the sound chamber, or a sound chamber is formed by the piezoelectric film layer, the electrostatic protective layer, the display layer and the buffer layer surrounding the sound chamber.

6. The flexible display panel of claim 4, wherein the support layer comprises a buffer layer arranged around the piezoelectric film layer, the buffer layer is coupled to the display layer and the electrostatic protective layer, and wherein the piezoelectric film layer is coupled to the electrostatic protective layer and is spaced from the display layer by a predetermined distance; and
    wherein a sound chamber is formed by the piezoelectric film layer, the display layer, and the buffer layer surrounding the sound chamber, or a sound chamber is formed by the piezoelectric film layer, the electrostatic protective layer, the display layer and the buffer layer surrounding the sound chamber.

7. The flexible display panel of claim 1, wherein the electrostatic protective layer comprises an air vent.

8. An electronic device comprising:
    a flexible display panel, wherein the flexible display panel comprises:
        an unbent state, and
        a bent state, wherein a bending part of the flexible display panel is bent when the flexible display panel is in the bent state; and
        wherein the flexible display panel comprises a display layer, a bonding layer and a support layer, the bonding layer is bonded between the display layer and the support layer, at least one of the support layer and the bonding layer comprising buffer openings, the buffer openings are positioned to at least correspond to the bending part,
        wherein the support layer comprises a piezoelectric film layer, wherein the piezoelectric film layer drives the display layer to vibrate in response to being deformed, and
        wherein the flexible display panel further comprises an electrostatic protective layer, coupled to a side of the support layer and away from the display layer.

9. The electronic device of claim 8, wherein the support layer comprises a buffer layer, wherein at least one of the buffer layer or the piezoelectric film layer are coupled to the display layer through the bonding layer; and
    wherein when the support layer comprises the buffer openings, the buffer openings are provided on at least one of the piezoelectric film layer and the buffer layer.

10. The electronic device of claim 9, wherein
    the buffer layer is arranged around at least a part of the piezoelectric film layer.

11. The electronic device of claim 8, wherein the support layer comprises a buffer layer, wherein the buffer layer and the piezoelectric film layer are coupled to the electrostatic protective layer and the display layer.

12. The electronic device of claim 8, wherein the support layer comprises a buffer layer arranged around the piezoelectric film layer, wherein the buffer layer is coupled to the display layer and the electrostatic protective layer, and wherein the piezoelectric film layer is coupled to the display layer and is spaced from the electrostatic protective layer by a predetermined distance; and
    wherein a sound chamber is formed by the piezoelectric film layer, the electrostatic protective layer, and the buffer layer surrounding the sound chamber, or a sound chamber is formed by the piezoelectric film layer, the electrostatic protective layer, the display layer and the buffer layer surrounding the sound chamber.

13. The electronic device of claim 11, wherein the support layer comprises a buffer layer arranged around the piezoelectric film layer, wherein the buffer layer is coupled to the display layer and the electrostatic protective layer, and wherein the piezoelectric film layer is coupled to the electrostatic protective layer and is spaced from the display layer by a predetermined distance; and wherein a sound chamber is formed by the piezoelectric film layer, the display layer, and the buffer layer surrounding the sound chamber, or a sound chamber is formed by the piezoelectric film layer, the electrostatic protective layer, the display layer and the buffer layer surrounding the sound chamber.

14. The electronic device of claim 8, wherein the electrostatic protective layer comprises an air vent.

\* \* \* \* \*